United States Patent
Xu et al.

(10) Patent No.: US 9,320,044 B2
(45) Date of Patent: Apr. 19, 2016

(54) COMMUNICATION INTERFERENCE PROCESSING METHOD AND WIRELESS ROUTER

(71) Applicant: Huawei Device Co., Ltd., Shenzhen (CN)

(72) Inventors: Tianliang Xu, Xi'an (CN); Chao Xiang, Xi'an (CN); Shufeng Wang, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 175 days.

(21) Appl. No.: 14/142,024

(22) Filed: Dec. 27, 2013

(65) Prior Publication Data

US 2014/0169301 A1    Jun. 19, 2014

Related U.S. Application Data

(63) Continuation of application No. PCT/CN2013/079317, filed on Jul. 12, 2013.

(30) Foreign Application Priority Data

Dec. 18, 2012    (CN) .......................... 2012 1 0551953

(51) Int. Cl.
H04W 72/08    (2009.01)
H04W 16/00    (2009.01)

(52) U.S. Cl.
CPC ............ H04W 72/082 (2013.01); H04W 16/00 (2013.01)

(58) Field of Classification Search
CPC .................................................. H04W 72/082
See application file for complete search history.

(56) References Cited

U.S. PATENT DOCUMENTS

| 8,340,580 | B1 * | 12/2012 | Epstein | 455/63.1 |
| 2008/0062919 | A1 * | 3/2008 | Chen et al. | 370/329 |
| 2009/0268649 | A1 * | 10/2009 | Krishnaswamy | 370/310 |
| 2010/0067488 | A1 | 3/2010 | Sashihara | |
| 2010/0081447 | A1 | 4/2010 | Qi et al. | |

(Continued)

FOREIGN PATENT DOCUMENTS

| CN | 101594669 A | 12/2009 |
| CN | 101677290 A | 3/2010 |

(Continued)

OTHER PUBLICATIONS

Motorola Mobility, "In-Device Coexistence of Band 7 and ISM," 3GPP TSG-RAN WG2 #78, May 21-25, 2012, 3 pages.

*Primary Examiner* — Jason Mattis
(74) *Attorney, Agent, or Firm* — Slater & Matsil, L.L.P.

(57) ABSTRACT

A communication interference processing method includes: obtaining an access band of a wireless wide area network and a working channel of a Wi-Fi wireless local area network; and if interference exists between the access band of the wireless wide area network and the working channel of the Wi-Fi wireless local area network, and no Wi-Fi user is currently accessing the Wi-Fi wireless local area network, changing the working channel of the Wi-Fi wireless local area network so that no interference exists between the working channel of the Wi-Fi wireless local area network after the change and the access band of the wireless wide area network. In the embodiments of the present invention, the wireless router may automatically adjust the working channel of the Wi-Fi wireless local area network, thereby effectively avoiding the problem of interference between a network signal of the wireless wide area network and a Wi-Fi signal.

6 Claims, 3 Drawing Sheets

(56) References Cited

U.S. PATENT DOCUMENTS

| | | | |
|---|---|---|---|
| 2010/0177710 A1* | 7/2010 | Gutkin et al. | 370/329 |
| 2012/0034937 A1* | 2/2012 | Cahill et al. | 455/465 |
| 2012/0039197 A1* | 2/2012 | Jang et al. | 370/252 |
| 2012/0040620 A1 | 2/2012 | Fu et al. | |
| 2013/0029704 A1* | 1/2013 | Koo et al. | 455/501 |

FOREIGN PATENT DOCUMENTS

| | | |
|---|---|---|
| CN | 102484805 A | 5/2012 |
| CN | 102769919 A | 11/2012 |
| JP | 10136426 A | 5/1998 |
| JP | 200069565 A | 3/2000 |
| JP | 2005278052 A | 10/2005 |
| JP | 2009545272 A | 12/2009 |
| JP | 2013545368 A | 12/2013 |
| WO | 2008016809 A1 | 2/2008 |
| WO | 2008102504 A1 | 8/2008 |
| WO | 2009045646 A2 | 4/2009 |
| WO | 2012051952 A1 | 4/2012 |

* cited by examiner

FIG. 4

COMMUNICATION INTERFERENCE PROCESSING METHOD AND WIRELESS ROUTER

This application is a continuation of International Application No. PCT/CN2013/079317, filed on Jul. 12, 2013, which claims priority to Chinese Patent Application No. 201210551953.8, filed on Dec. 18, 2012, both of which are hereby incorporated by reference in their entireties.

TECHNICAL FIELD

Embodiments of the present invention relate to the communications field, and in particular, to a communication interference processing method and a wireless router.

BACKGROUND

With popularization of mobile Wi-Fi products, more wireless products share open frequency spectrum resources, and an increasingly serious wireless signal interference problem follows accordingly.

A wireless router may convert a 3G (3rd-generation, third-generation mobile communications technologies)/4G network signal into a Wi-Fi signal, which is shared to a nearby Wi-Fi device. However, the 3G/4G network signal and the Wi-Fi signal may interfere with each other. For example, interference may exist between the Wi-Fi 2.4G band (2.4 GHz) and the Long Term Evolution (LTE) Band7 (Band7 ranges from 2.5 GHz to 2.57 GHz), and between the Wi-Fi 2.4G band (2.4 GHz) and the Worldwide Interoperability for Microwave Access (WiMAX) 2.3G and 2.5G bands, where the Wi-Fi 2.4G band may be divided into channel 1 to channel 13. To be specific, the LTE Band7 and the WiMAX 2.5G band may affect a radio frequency indicator of Wi-Fi channel 8 to channel 13, resulting in that Wi-Fi channel 8 to channel 13 cannot work normally; and the WiMAX 2.3G band may affect a radio frequency indicator of Wi-Fi channel 1 to channel 7, resulting in that Wi-Fi channel 1 to channel 7 cannot work normally.

When a 3G/LTE network signal and a Wi-Fi signal interfere with each other, the interference may result in that Wi-Fi cannot work normally and a service is interrupted. Therefore, interference between a 3G/LTE network signal and a Wi-Fi signal needs to be avoided.

SUMMARY OF THE INVENTION

Embodiments of the present invention provide a communication interference processing method in an aspect, provide a wireless router in another aspect, and further provide a wireless router in another aspect, which can avoid interference between a 3G/LTE network signal and a Wi-Fi signal.

According to a first aspect, a communication interference processing method includes obtaining an access band of a wireless wide area network and a working channel of a Wi-Fi wireless local area network, and if interference exists between the access band of the wireless wide area network and the working channel of the Wi-Fi wireless local area network, and no Wi-Fi user is currently accessing the Wi-Fi wireless local area network, changing the working channel of the Wi-Fi wireless local area network so that no interference exists between the working channel of the Wi-Fi wireless local area network after the change and the access band of the wireless wide area network.

In a first possible implementation manner of the first aspect, the method further includes, if interference exists between the access band of the wireless wide area network and the working channel of the Wi-Fi wireless local area network, and a Wi-Fi user is currently accessing the Wi-Fi wireless local area network, obtaining data traffic corresponding to the Wi-Fi user who is currently accessing the Wi-Fi wireless local area network, and determining, according to the data traffic corresponding to the Wi-Fi user, whether to change the working channel of the Wi-Fi wireless local area network.

With reference to the first possible implementation manner of the first aspect, in a second possible implementation manner, the determining, according to the data traffic corresponding to the Wi-Fi user, whether to change the working channel of the Wi-Fi wireless local area network includes, if the data traffic corresponding to the Wi-Fi user is less than or equal to a first threshold within a preset period of time, changing the working channel of the Wi-Fi wireless local area network so that no interference exists between the working channel of the Wi-Fi wireless local area network after the change and the access band of the wireless wide area network.

With reference to the first aspect, or the first possible implementation manner of the first aspect or the second possible implementation manner of the first aspect, in a third possible implementation manner, the changing the working channel of the Wi-Fi wireless local area network so that no interference exists between the working channel of the Wi-Fi wireless local area network after the change and the access band of the wireless wide area network includes changing the working channel of the Wi-Fi wireless local area network to any one of channel a2 to channel b2 if the working channel of the Wi-Fi wireless local area network before the change is any one of channel a1 to channel b1, so that no interference exists between the working channel of the Wi-Fi wireless local area network after the change and the access band of the wireless wide area network, where channel a1 to channel b1 are channel 1 to channel 7, and channel a2 to channel b2 are channel 8 to channel 11, channel 8 to channel 13 or channel 8 to channel 14; or channel a1 to channel b1 are channel 8 to channel 11, channel 8 to channel 13 or channel 8 to channel 14, and channel a2 to channel b2 are channel 1 to channel 7.

According to a second aspect, a wireless router includes a processor, a modem and a Wi-Fi module, where the processor is separately connected to the modem and the Wi-Fi module. The modem is configured to access a wireless wide area network and obtain an access band of the wireless wide area network. The Wi-Fi module is configured to provide a Wi-Fi wireless local area network, obtain a working channel of the Wi-Fi wireless local area network and change the working channel of the Wi-Fi wireless local area network. The processor is configured to obtain the access band of the wireless wide area network from the modem, and obtain, from the Wi-Fi module, the working channel of the Wi-Fi wireless local area network, and whether a Wi-Fi user is currently accessing the Wi-Fi wireless local area network; and further configured to determine whether interference exists between the access band of the wireless wide area network and the working channel of the Wi-Fi wireless local area network, and if interference exists between the access band of the wireless wide area network and the working channel of the Wi-Fi wireless local area network, and no Wi-Fi user is currently accessing the Wi-Fi wireless local area network, instruct the Wi-Fi module to change the working channel of the Wi-Fi wireless local area network, so that no interference exists between the working channel of the Wi-Fi wireless local area network after the change and the access band of the wireless wide area network.

In a first possible implementation manner of the second aspect, the processor is further configured to, if interference exists between the access band of the wireless wide area network and the working channel of the Wi-Fi wireless local area network, and a Wi-Fi user is currently accessing the Wi-Fi wireless local area network, obtain, by using the Wi-Fi module, data traffic corresponding to the Wi-Fi user who is currently accessing the Wi-Fi wireless local area network, and determine, according to the data traffic corresponding to the Wi-Fi user, whether to change the working channel of the Wi-Fi wireless local area network.

With reference to the first possible implementation manner of the second aspect, in a second possible implementation manner, that the processor determines, according to the data traffic corresponding to the Wi-Fi user, whether to change the working channel of the Wi-Fi wireless local area network specifically includes that, if the data traffic corresponding to the Wi-Fi user is less than or equal to a first threshold within a preset period of time, the processor instructs the Wi-Fi module to change the working channel of the Wi-Fi wireless local area network so that no interference exists between the working channel of the Wi-Fi wireless local area network after the change and the access band of the wireless wide area network.

According to a third aspect, a wireless router includes a processor, a modem and a Wi-Fi module, where the processor is separately connected to the modem and the Wi-Fi module. The modem is configured to access a wireless wide area network and obtain an access band of the wireless wide area network. The Wi-Fi module is configured to provide a Wi-Fi wireless local area network, obtain a working channel of the Wi-Fi wireless local area network and obtain whether a Wi-Fi user is currently accessing the Wi-Fi wireless local area network. The processor is configured to send the access band of the wireless wide area network obtained by the modem to the Wi-Fi module. The Wi-Fi module is further configured to determine whether interference exists between the access band of the wireless wide area network and the working channel of the Wi-Fi wireless local area network, and if interference exists between the access band of the wireless wide area network and the working channel of the Wi-Fi wireless local area network, and no Wi-Fi user is currently accessing the Wi-Fi wireless local area network, change the working channel of the Wi-Fi wireless local area network, so that no interference exists between the working channel of the Wi-Fi wireless local area network after the change and the access band of the wireless wide area network.

In a first possible implementation manner of the third aspect, the Wi-Fi module is further configured to obtain data traffic corresponding to the Wi-Fi user who is currently accessing the wireless local area network, and if interference exists between the access band of the wireless wide area network and the working channel of the Wi-Fi wireless local area network, and the Wi-Fi user is currently accessing the Wi-Fi wireless local area network, determine, according to the data traffic corresponding to the Wi-Fi user, whether to change the working channel of the Wi-Fi wireless local area network.

With reference to the first possible implementation manner of the third aspect, in a second possible implementation manner, that the Wi-Fi module determines, according to the data traffic corresponding to the Wi-Fi user, whether to change the working channel of the Wi-Fi wireless local area network includes that, if the data traffic corresponding to the Wi-Fi user is less than or equal to a first threshold within a preset period of time, the Wi-Fi module changes the working channel of the Wi-Fi wireless local area network so that no interference exists between the working channel of the Wi-Fi wireless local area network after the change and the access band of the wireless wide area network.

In the embodiments of the present invention, when interference exists between an access band of a wireless wide area network and a working channel of a Wi-Fi wireless local area network, and no Wi-Fi user is currently accessing the Wi-Fi wireless local area network, a wireless router may automatically adjust the working channel of the Wi-Fi wireless local area network, so that no interference exists between the working channel of the Wi-Fi wireless local area network after the adjustment and the access band of the wireless wide area network, thereby effectively avoiding the problem of interference between a network signal of the wireless wide area network and a Wi-Fi signal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
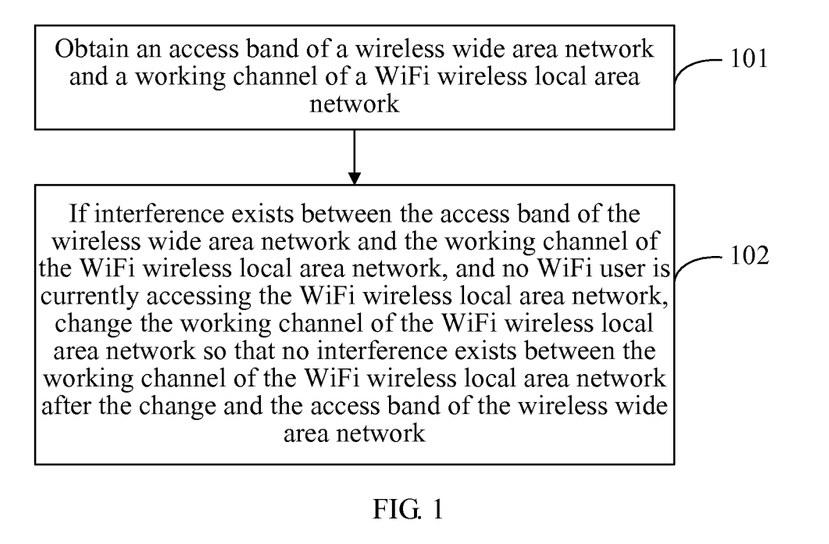
FIG. 1 is a flow chart of a communication interference processing method according to an embodiment of the present invention.

FIG. 1 is a flow chart of a communication interference processing method according to an embodiment of the present invention; as shown in FIG. 1, the method includes:

Step 101: Obtain an access band of a wireless wide area network and a working channel of a Wi-Fi wireless local area network.

The communication interference processing method provided by the embodiment of the present invention is implemented by a wireless router. The wireless router may access the wireless wide area network in a wireless manner, and may serve as a Wi-Fi access point (Wi-Fi AP) to provide a wireless local area network, where the wireless local area network is the Wi-Fi wireless local area network.

When accessing the wireless wide area network, the wireless router may obtain an access band of the wireless wide area network. When providing the Wi-Fi wireless local area network, the wireless router may obtain a working channel of the Wi-Fi wireless local area network.

It should be noted that the wireless router works in a fixed access band after accessing the wireless wide area network while the Wi-Fi wireless local area network provided by the wireless router works in a fixed channel. A band in the Wi-Fi wireless local area network may include multiple channels, for example: the 2.4G band in the Wi-Fi wireless local area network may include multiple channels according to different conditions, for example, the 2.4G band in a Wi-Fi wireless local area network in China includes channel 1 to channel 13, the 2.4G band in a Wi-Fi wireless local area network in Japan includes channel 1 to channel 14, and the 2.4G band in a Wi-Fi wireless local area network in the USA includes channel 1 to channel 11.

Step 102: If interference exists between the access band of the wireless wide area network and the working channel of the Wi-Fi wireless local area network, and no Wi-Fi user is currently accessing the Wi-Fi wireless local area network, change the working channel of the Wi-Fi wireless local area network so that no interference exists between the working channel of the Wi-Fi wireless local area network after the change and the access band of the wireless wide area network.

After obtaining the access band of the wireless wide area network and the working channel of the Wi-Fi wireless local area network, the wireless router may determine whether interference exists between the access band of the wireless wide area network and the working channel of the Wi-Fi wireless local area network.

It should be noted that: the 2.4G band in a Wi-Fi wireless local area network may include channel 1 to channel 13, channel 1 to channel 11, or channel 1 to channel 14. Interference exists between LTE Band7 or WiMAX 2.5G band and Wi-Fi channel 8 to channel 13 (channel 8 to channel 11 or channel 8 to channel 14) while interference exists between WiMAX 2.3G band and Wi-Fi channel 1 to channel 7. For example: when an access band of a wireless wide area network is LTE Band7 or WiMAX 2.5G band, and a working channel of a Wi-Fi wireless local area network is any one of channel 8 to channel 13, interference exists between the access band of the wireless wide area network and the working channel of the Wi-Fi wireless local area network.

When providing a Wi-Fi wireless local area network, the wireless router may learn whether a Wi-Fi user is accessing the Wi-Fi wireless local area network.

When obtaining that interference exists between the access band of the wireless wide area network and the working channel of the Wi-Fi wireless local area network, the wireless router may then check whether a Wi-Fi user is currently accessing the Wi-Fi wireless local area network; if no Wi-Fi user is currently accessing the Wi-Fi wireless local area network, the wireless router may adjust the working channel of the Wi-Fi wireless local area network to a channel, where no interference exists between the channel and the access band of the wireless wide area network.

In the embodiment of the present invention, when interference exists between an access band of a wireless wide area network and a working channel of a Wi-Fi wireless local area network, and no Wi-Fi user is currently accessing the Wi-Fi wireless local area network, a wireless router may automatically adjust the working channel of the Wi-Fi wireless local area network, so that no interference exists between the working channel of the Wi-Fi wireless local area network after the adjustment and the access band of the wireless wide area network, thereby effectively avoiding the problem of interference between a network signal of the wireless wide area network and a Wi-Fi signal.

Figure 2:
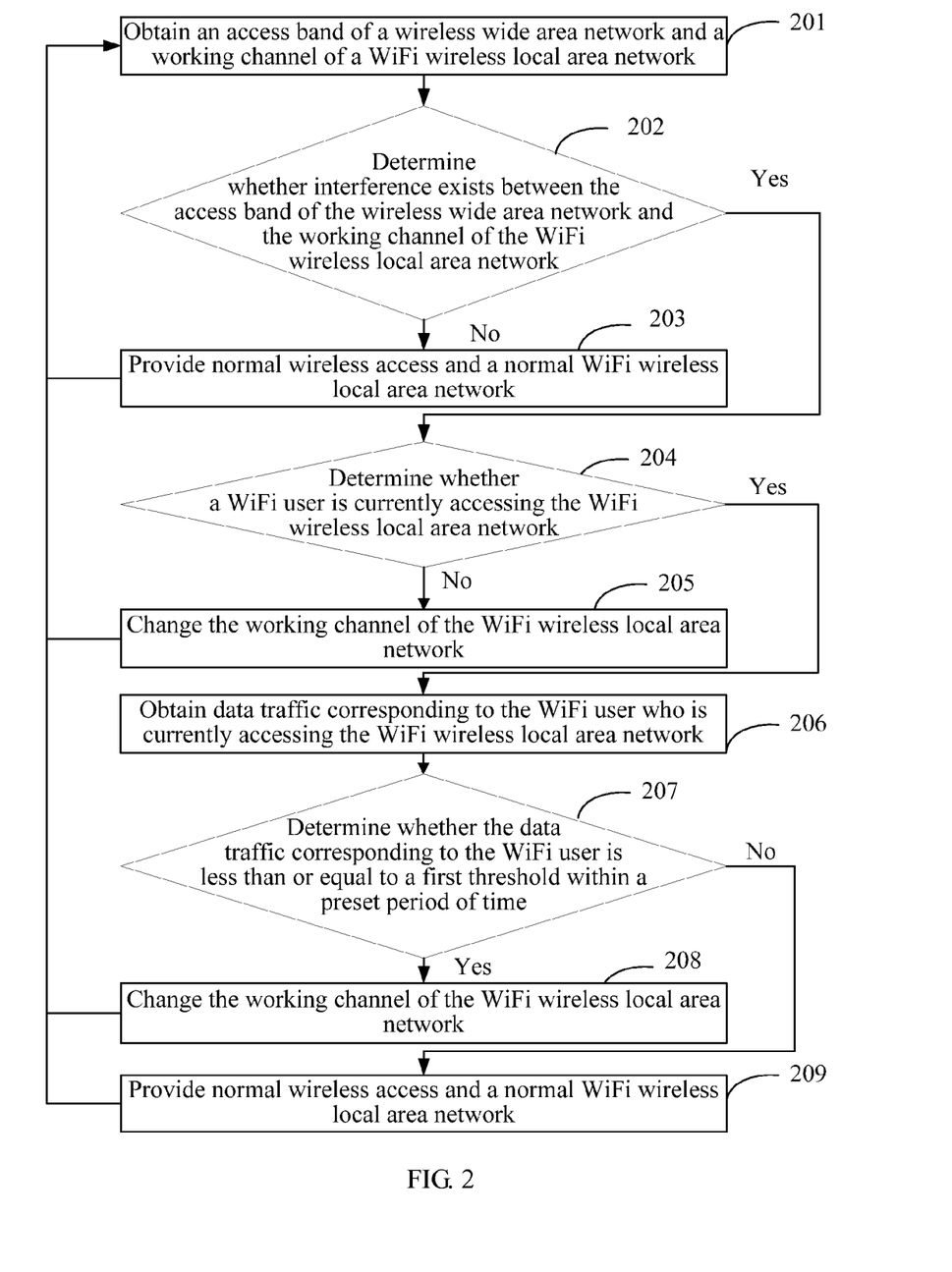
FIG. 2 is a flow chart of another communication interference processing method according to an embodiment of the present invention.

FIG. 2 is a flow chart of another communication interference processing method according to an embodiment of the present invention; on the basis of the embodiment shown in FIG. 1, as shown in FIG. 2, the method includes the following steps.

Step 201: Obtain an access band of a wireless wide area network and a working channel of a Wi-Fi wireless local area network.

A wireless router may include a modem (modem) and a Wi-Fi module, where the modem is configured to access a wireless wide area network, and the Wi-Fi module is configured to provide a Wi-Fi wireless local area network. An access band of a wireless wide area network may be obtained by using the modem, and a working channel of a Wi-Fi wireless local area network may be obtained by using the Wi-Fi module.

The wireless router accesses the wireless wide area network by using the modem and obtains a current access band of the wireless wide area network. The wireless router provides the Wi-Fi wireless local area network by using the Wi-Fi module, and obtains a current working channel of the Wi-Fi wireless local area network.

Step 202: The wireless router determines whether interference exists between the access band of the wireless wide area network and the working channel of the Wi-Fi wireless local area network, and executes step 203 if no interference exists, or executes step 204 if interference exists.

The wireless router further includes a processor. The processor may obtain the access band of the wireless wide area network from the modem and the working channel of the Wi-Fi wireless local area network modem from the Wi-Fi module respectively, and determines whether interference exists. The processor may also obtain the access band of the wireless wide area network from the modem, and send the access band of the wireless wide area network to the Wi-Fi module, and the Wi-Fi module determines whether interference exists.

For example: if an access band of a wireless wide area network is LTE Band7 or WiMAX 2.5G band, and a working channel of a Wi-Fi wireless local area network is any one of channel 8 to channel 13, interference exists between the access band of the wireless wide area network and the working channel of the Wi-Fi wireless local area network; if an access band of a wireless wide area network is WiMAX 2.3G band, and a working channel of a Wi-Fi wireless local area network is any one of channel 1 to channel 7, interference exists between the access band of the wireless wide area network and the working channel of the Wi-Fi wireless local area network.

Step 203: The wireless router provides normal wireless access and a normal Wi-Fi wireless local area network, does not need to adjust the working channel of the Wi-Fi wireless local area network, and ends the procedure, or executes step 201 again after a period of time. The executing step 201 again after a period of time may be: setting a time interval according to a specific application scenario and executing step 201 again after the time interval.

Step 204: The wireless router determines whether a Wi-Fi user is currently accessing the Wi-Fi wireless local area network; and executes step 205 if no Wi-Fi user is accessing the Wi-Fi wireless local area network, or executes step 206 if a Wi-Fi user is accessing the Wi-Fi wireless local area network.

Whether a Wi-Fi user is currently accessing the Wi-Fi wireless local area network can be obtained by using the Wi-Fi module.

Step 205: The wireless router changes the working channel of the Wi-Fi wireless local area network so that no interference exists between the working channel of the Wi-Fi wireless local area network after the change and the access band of the wireless wide area network, and ends the procedure, or executes step 201 again after a period of time.

The wireless router may reset a channel range by using the Wi-Fi module, that is, the working channel of the Wi-Fi wireless local area network is changed to avoid interference. For example: the working channel of the Wi-Fi wireless local area network is changed to any one of channel a2 to channel b2 if the working channel of the Wi-Fi wireless local area network before the change is any one of channel a1 to channel b1, so that no interference exists between the working channel of the Wi-Fi wireless local area network after the change and the access band of the wireless wide area network, where channel a1 to channel b1 are channel 1 to channel 7, and channel a2 to channel b2 are channel 8 to channel 11, channel 8 to channel 13 or channel 8 to channel 14; or channel a1 to channel b1 are channel 8 to channel 11, channel 8 to channel 13 or channel 8 to channel 14, and channel a2 to channel b2 are channel 1 to channel 7.

The access band of the wireless wide area network, for example, may be LTE Band7, WiMAX 2.3G band and WiMAX 2.5G band. Interference exists between LTE Band7 or WiMAX 2.5G band and Wi-Fi channel 8 to channel 11, channel 8 to channel 13 or channel 8 to channel 14; interference exists between WiMAX 2.3G band and Wi-Fi channel 1 to channel 7; no interference exists between LTE Band7 or WiMAX 2.5G band and Wi-Fi channel 1 to channel 7; no interference exists between WiMAX 2.3G band and Wi-Fi channel 8 to channel 11, channel 8 to channel 13 or channel 8 to channel 14. It should be noted that the embodiment of the present invention does not limit the channel range and the division manner of a Wi-Fi wireless local area network. In a specific implementation manner, how to adjust a working channel may be determined according to an actually applied Wi-Fi channel range. For example: if an actually applied Wi-Fi channel range is channel 1 to channel 13, a working channel may be adjusted to any one of channel 8 to channel 13 to avoid interference between channel 1 to channel 13 and the WiMAX 2.3G band; if an actually applied Wi-Fi channel range is channel 1 to channel 14, a working channel may be adjusted to any one of channel 8 to channel 14 to avoid interference between channel 1 to channel 14 and the WiMAX 2.3G band. Furthermore, when a working channel is adjusted to any one of channel 8 to channel 13, the any one channel may be selected randomly or according to a certain rule, for example, the adjustment may be implemented by the driving of the Wi-Fi module according to an automatic channel selection algorithm to preferentially select a channel that meets a requirement.

After the wireless router changes the working channel of the Wi-Fi wireless local area network, that is, after switching a Wi-Fi channel range, a Wi-Fi user accesses again the Wi-Fi wireless local area network, and a data service is restored to normal.

Step 206: The wireless router obtains data traffic corresponding to the Wi-Fi user who is currently accessing the WI-FI wireless local area network.

The wireless router may detect whether currently there is data traffic at a fixed time interval, and record data traffic within a period of time; for example, whether currently there is data traffic is detected first; if there is no data traffic, whether there is data traffic may be detected once every thirty seconds; if there is data traffic, current data traffic is recorded, and data traffic within a period of time (for example, 10 minutes) may be recorded.

Step 207: The wireless router may determine, according to the data traffic corresponding to the Wi-Fi user, whether to change the working channel of the Wi-Fi wireless local area network; to be specific, the wireless router determines whether the data traffic corresponding to the Wi-Fi user is less than or equal to a first threshold within a preset period of time; and if yes, executes step 208, or if no, executes step 209.

For example: the first threshold (for example, 0.5 kbps) may be preset; when the data traffic corresponding to the Wi-Fi user is less than or equal to the first threshold within a period of time, it means that the current data traffic is very small or interference is serious, and the working channel of the Wi-Fi wireless local area network needs to be adjusted; when the data traffic corresponding to the Wi-Fi user is larger than the first threshold within a period of time, it means that the current interference is not serious, and the user is using the Wi-Fi wireless local area network for a data service, and the working channel of the Wi-Fi wireless local area network is not adjusted in this case.

Step 207 may be executed by the Wi-Fi module, or the processor in the wireless router.

Step 208: The wireless router changes the working channel of the Wi-Fi wireless local area network so that no interference exists between the working channel of the Wi-Fi wireless local area network after the change and the access band of the wireless wide area network, and ends the procedure, or executes step 201 again after a period of time.

After the wireless router changes the working channel of the Wi-Fi wireless local area network, that is, after switching the Wi-Fi channel range, the Wi-Fi user accesses the Wi-Fi wireless local area network again, and a data service is restored to normal.

Step 209: The wireless router provides normal wireless access and a normal Wi-Fi wireless local area network, and ends the procedure, or executes step 201 again after a period of time.

When the data traffic corresponding to the Wi-Fi user is larger than the first threshold within a period of time, the wireless router temporarily does not adjust the working channel of the Wi-Fi wireless local area network. At this moment, the wireless router may detect whether there is interference at a fixed time interval and whether a Wi-Fi user is accessing the Wi-Fi wireless local area network, and if there is interference and a user is accessing the Wi-Fi wireless local area network, then detect the data traffic corresponding to the Wi-Fi user to determine whether to adjust the working channel of the Wi-Fi wireless local area network according to the data traffic.

In the embodiment of the present invention, when interference exists between an access band of a wireless wide area network and a working channel of a Wi-Fi wireless local area network, a wireless router may determine whether to adjust the working channel of the Wi-Fi wireless local area network according to an access condition and a data traffic condition of a current Wi-Fi user and automatically adjust the working channel of the Wi-Fi wireless local area network when there is interference, thereby effectively reducing interference of another band to a Wi-Fi channel, avoiding disconnection or service interruption for a Wi-Fi user and improving user experience.

Figure 3:
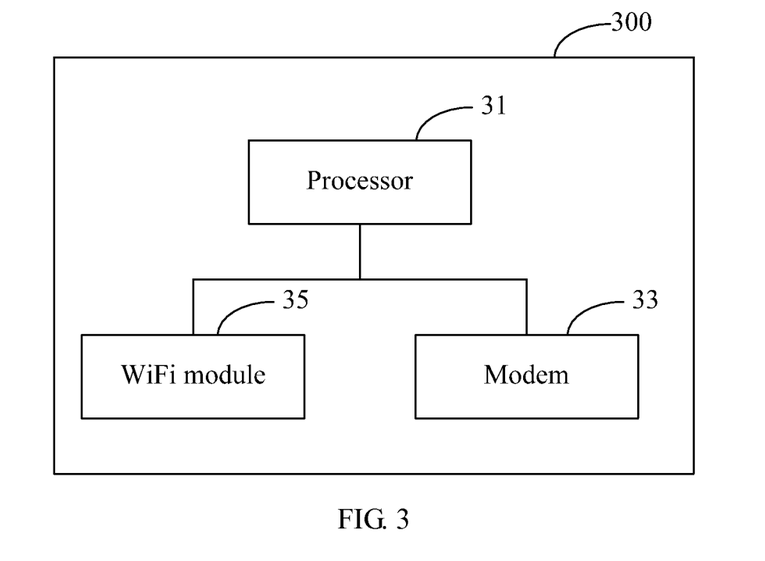
FIG. 3 is a schematic structural diagram of a wireless router according to an embodiment of the present invention.

FIG. 3 is a schematic structural diagram of a wireless router according to an embodiment of the present invention, and as shown in FIG. 3, a wireless router 300 includes: a processor 31, a modem 33 and a Wi-Fi module 35, where the processor 31 is separately connected to the modem 33 and the Wi-Fi module 35.

The modem 33 is configured to access a wireless wide area network and obtain an access band of the wireless wide area network.

The Wi-Fi module 35 is configured to provide a Wi-Fi wireless local area network, obtain a working channel of the Wi-Fi wireless local area network and change the working channel of the Wi-Fi wireless local area network.

The processor 31 is configured to obtain the access band of the wireless wide area network from the modem 33, and obtain, from the Wi-Fi module 35, the working channel of the Wi-Fi wireless local area network, and whether a Wi-Fi user is currently accessing the Wi-Fi wireless local area network; and further configured to determine whether interference exists between the access band of the wireless wide area network and the working channel of the Wi-Fi wireless local area network, and if interference exists between the access band of the wireless wide area network and the working channel of the Wi-Fi wireless local area network, and no Wi-Fi user is currently accessing the Wi-Fi wireless local area network, instruct the Wi-Fi module 35 to change the working channel of the Wi-Fi wireless local area network, so that no interference exists between the working channel of the Wi-Fi wireless local area network after the change and the access band of the wireless wide area network.

In another implementation manner, furthermore, the processor 31 is further configured to: if interference exists between the access band of the wireless wide area network and the working channel of the Wi-Fi wireless local area network, and a Wi-Fi user is currently accessing the Wi-Fi wireless local area network, obtain, by using the Wi-Fi module 35, data traffic corresponding to the Wi-Fi user who is currently accessing the Wi-Fi wireless local area network; and determine, according to the data traffic corresponding to the Wi-Fi user, whether to change the working channel of the Wi-Fi wireless local area network.

Furthermore, that the processor 31 determines, according to the data traffic corresponding to the Wi-Fi user, whether to change the working channel of the Wi-Fi wireless local area network may specifically include that: if the data traffic corresponding to the Wi-Fi user is less than or equal to a first threshold within a preset period of time, the processor 31 instructs the Wi-Fi module 35 to change the working channel of the Wi-Fi wireless local area network so that no interference exists between the working channel of the Wi-Fi wireless local area network after the change and the access band of the wireless wide area network.

The wireless router is configured to execute the communication interference processing method in the embodiment shown in FIG. 1 or FIG. 2. Reference is made to description in the embodiment shown in FIG. 1 or FIG. 2 for specific execution steps and principles, which is not described again herein.

In the embodiment of the present invention, when interference exists between an access band of a wireless wide area network and a working channel of a Wi-Fi wireless local area network, a wireless router may determine whether to adjust the working channel of the Wi-Fi wireless local area network according to an access condition and a data traffic condition of a current Wi-Fi user and automatically adjust the working channel of the Wi-Fi wireless local area network when there is interference, thereby effectively reducing interference of another band to a Wi-Fi channel, avoiding disconnection or service interruption for a Wi-Fi user and improving user experience.

Figure 4:
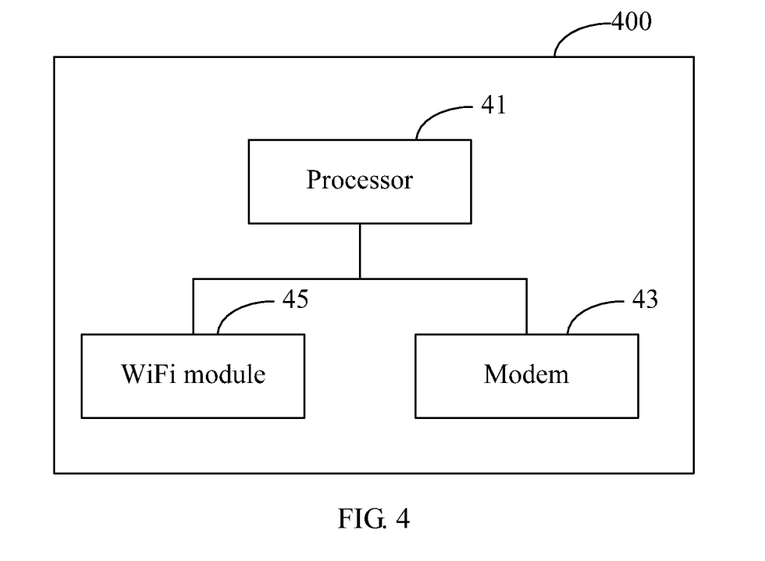
FIG. 4 is a schematic structural diagram of another wireless router according to an embodiment of the present invention.

FIG. 4 is a schematic structural diagram of another wireless router according to an embodiment of the present invention, and as shown in FIG. 4, a wireless router 400 includes: a processor 41, a modem 43 and a Wi-Fi module 45, where the processor 41 is separately connected to the modem 43 and the Wi-Fi module 45.

The modem 43 is configured to access a wireless wide area network and obtain an access band of the wireless wide area network.

The Wi-Fi module 45 is configured to provide a Wi-Fi wireless local area network, obtain a working channel of the Wi-Fi wireless local area network and obtain whether a Wi-Fi user is currently accessing the Wi-Fi wireless local area network.

The processor 41 is configured to send the access band of the wireless wide area network obtained by the modem 43 to the Wi-Fi module 45.

The Wi-Fi module 45 is further configured to determine whether interference exists between the access band of the wireless wide area network and the working channel of the Wi-Fi wireless local area network, and if interference exists between the access band of the wireless wide area network and the working channel of the Wi-Fi wireless local area network, and no Wi-Fi user is currently accessing the Wi-Fi wireless local area network, change the working channel of the Wi-Fi wireless local area network, so that no interference exists between the working channel of the Wi-Fi wireless local area network after the change and the access band of the wireless wide area network.

In another implementation manner, furthermore, the Wi-Fi module 45 is further configured to: obtain data traffic corresponding to the Wi-Fi user who is currently accessing the wireless local area network; and if interference exists between the access band of the wireless wide area network and the working channel of the Wi-Fi wireless local area network, and a Wi-Fi user is currently accessing the Wi-Fi wireless local area network, determine, according to the data traffic corresponding to the Wi-Fi user, whether to change the working channel of the Wi-Fi wireless local area network.

Furthermore, that the Wi-Fi module 45 determines, according to the data traffic corresponding to the Wi-Fi user, whether to change the working channel of the Wi-Fi wireless local area network may specifically include that:

if the data traffic corresponding to the Wi-Fi user is less than or equal to a first threshold within a preset period of time, the Wi-Fi module changes the working channel of the Wi-Fi wireless local area network so that no interference exists between the working channel of the Wi-Fi wireless local area network after the change and the access band of the wireless wide area network.

The wireless router is configured to execute the communication interference processing method in the embodiment shown in FIG. 1 or FIG. 2. Reference is made to description in the embodiment shown in FIG. 1 or FIG. 2 for specific execution steps and principles, which is not described again herein.

In the embodiment of the present invention, when interference exists between an access band of a wireless wide area network and a working channel of a Wi-Fi wireless local area network, a wireless router may determine whether to adjust the working channel of the Wi-Fi wireless local area network according to an access condition and a data traffic condition of a current Wi-Fi user and automatically adjust the working channel of the Wi-Fi wireless local area network when there is interference, thereby effectively reducing interference of another band to a Wi-Fi channel, avoiding disconnection or service interruption for a Wi-Fi user and improving user experience.

In a word, the foregoing descriptions are only exemplary embodiments of the present invention, and are not intended to limit the protection scope of the present invention. Any modification, equivalent replacement, or improvement made without departing from the spirit and principle of the present invention should fall within the protection scope of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A communication interference processing method, comprising:

obtaining an access band of a wireless wide area network and a working channel of a Wi-Fi wireless local area network; and when interference exists between the access band of the wireless wide area network and the working channel of the Wi-Fi wireless local area network, and no Wi-Fi user is currently accessing the Wi-Fi wireless local area network, changing the working channel of the Wi-Fi wireless local area network so that no interference exists between the working channel of the Wi-Fi wireless local area network after the change and the access band of the wireless wide area network;

when interference exists between the access band of the wireless wide area network and the working channel of the Wi-Fi wireless local area network, and a Wi-Fi user is currently accessing the Wi-Fi wireless local area network, obtaining data traffic corresponding to the Wi-Fi user who is currently accessing the Wi-Fi wireless local area network; and determining, according to the data traffic corresponding to the Wi-Fi user, whether to change the working channel of the Wi-Fi wireless local area network, wherein the determining comprises:

when the data traffic corresponding to the Wi-Fi user is less than or equal to a first threshold within a preset period of time, changing the working channel of the Wi-Fi wireless local area network so that no interference exists between the working channel of the Wi-Fi wireless local area network after the change and the access band of the wireless wide area network.

2. The method according to claim 1, wherein the changing the working channel of the Wi-Fi wireless local area network so that no interference exists between the working channel of the Wi-Fi wireless local area network after the change and the access band of the wireless wide area network comprises:

changing the working channel of the Wi-Fi wireless local area network to any one of channel a2 to channel b2 when the working channel of the Wi-Fi wireless local area network before the change is any one of channel a1 to channel b1, so that no interference exists between the working channel of the Wi-Fi wireless local area network after the change and the access band of the wireless wide area network, wherein channel a1 to channel b1 are channel 1 to channel 7, and channel a2 to channel b2 are channel 8 to channel 11, channel 8 to channel 13 or channel 8 to channel 14; or, channel a1 to channel b1 are channel 8 to channel 11, channel 8 to channel 13 or channel 8 to channel 14, and channel a2 to channel b2 are channel 1 to channel 7.

3. A wireless router, comprising:

a processor;

a modem; and a Wi-Fi module, wherein the processor is separately connected to the modem and the Wi-Fi module;

wherein the modem is configured to access a wireless wide area network and obtain an access band of the wireless wide area network;

wherein the Wi-Fi module is configured to provide a Wi-Fi wireless local area network, obtain a working channel of the Wi-Fi wireless local area network and change the working channel of the Wi-Fi wireless local area network; and wherein the processor is configured to:

obtain the access band of the wireless wide area network from the modem, and obtain, from the Wi-Fi module, the working channel of the Wi-Fi wireless local area network, and whether a Wi-Fi user is currently accessing the Wi-Fi wireless local area network; and further configured to determine whether interference exists between the access band of the wireless wide area network and the working channel of the Wi-Fi wireless local area network, and when interference exists between the access band of the wireless wide area network and the working channel of the Wi-Fi wireless local area network, and no Wi-Fi user is currently accessing the Wi-Fi wireless local area network, instruct the Wi-Fi module to change the working channel of the Wi-Fi wireless local area network, so that no interference exists between the working channel of the Wi-Fi wireless local area network after the change and the access band of the wireless wide area network; and when interference exists between the access band of the wireless wide area network and the working channel of the Wi-Fi wireless local area network, and the Wi-Fi user is currently accessing the Wi-Fi wireless local area network, obtain, by using the Wi-Fi module, data traffic corresponding to the Wi-Fi user who is currently accessing the Wi-Fi wireless local area network; and determine, according to the data traffic corresponding to the Wi-Fi user, whether to change the working channel of the Wi-Fi wireless local area network, wherein the determining comprises:

when the data traffic corresponding to the Wi-Fi user is less than or equal to a first threshold within a preset period of time, the processor instructs the Wi-Fi module to change the working channel of the Wi-Fi wireless local area network so that no interference exists between the working channel of the Wi-Fi wireless local area network after the change and the access band of the wireless wide area network.

4. The wireless router according to claim 3, wherein:

the working channel of the Wi-Fi wireless local area network before the change is any one of channel a1 to channel b1;

the working channel of the Wi-Fi wireless local area network after the change is any one of channel a2 to channel b2; and channel a1 to channel b1 are channel 1 to channel 7, and channel a2 to channel b2 are channel 8 to channel 11, channel 8 to channel 13 or channel 8 to channel 14; or, channel a1 to channel b1 are channel 8 to channel 11, channel 8 to channel 13 or channel 8 to channel 14, and channel a2 to channel b2 are channel 1 to channel 7.

5. A wireless router, comprising:
a processor;
a modem; and
a Wi-Fi module, wherein the processor is separately connected to the modem and the Wi-Fi module;
wherein the modem is configured to access a wireless wide area network and obtain an access band of the wireless wide area network;
wherein the Wi-Fi module is configured to provide a Wi-Fi wireless local area network, obtain a working channel of the Wi-Fi wireless local area network and obtain whether a Wi-Fi user is currently accessing the Wi-Fi wireless local area network;
wherein the processor is configured to send the access band of the wireless wide area network obtained by the modem to the Wi-Fi module; and
wherein the Wi-Fi module is further configured to:
  determine whether interference exists between the access band of the wireless wide area network and the working channel of the Wi-Fi wireless local area network, and when interference exists between the access band of the wireless wide area network and the working channel of the Wi-Fi wireless local area network, and no Wi-Fi user is currently accessing the Wi-Fi wireless local area network, change the working channel of the Wi-Fi wireless local area network, so that no interference exists between the working channel of the Wi-Fi wireless local area network after the change and the access band of the wireless wide area network;
  obtain data traffic corresponding to the Wi-Fi user who is currently accessing the Wi-Fi wireless local area network; and when interference exists between the access band of the wireless wide area network and the working channel of the Wi-Fi wireless local area network, and the Wi-Fi user is currently accessing the Wi-Fi wireless local area network, determine, according to the data traffic corresponding to the Wi-Fi user, whether to change the working channel of the Wi-Fi wireless local area network, where in the determining comprises:
    when the data traffic corresponding to the Wi-Fi user is less than or equal to a first threshold within a preset period of time, the Wi-Fi module changes the working channel of the Wi-Fi wireless local area network so that no interference exists between the working channel of the Wi-Fi wireless local area network after the change and the access band of the wireless wide area network.

6. The wireless router according to claim 5, wherein:
the working channel of the Wi-Fi wireless local area network before the change is any one of channel a1 to channel b1;
the working channel of the Wi-Fi wireless local area network after the change is any one of channel a2 to channel b2; and
channel a1 to channel b1 are channel 1 to channel 7, and channel a2 to channel b2 are channel 8 to channel 11, channel 8 to channel 13 or channel 8 to channel 14; or, channel a1 to channel b1 are channel 8 to channel 11, channel 8 to channel 13 or channel 8 to channel 14, and channel a2 to channel b2 are channel 1 to channel 7.

* * * * *